May 2, 1967  W. J. KARPLUS  3,317,718
COMPUTER
Filed March 22, 1963  5 Sheets-Sheet 1

INVENTOR:
Walter Joseph Karplus

Attorneys

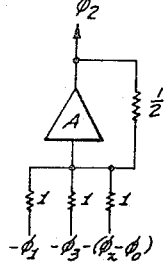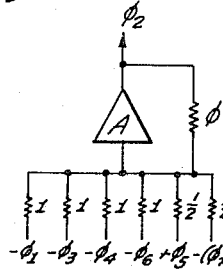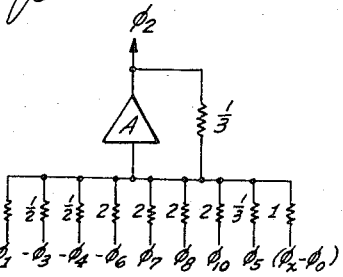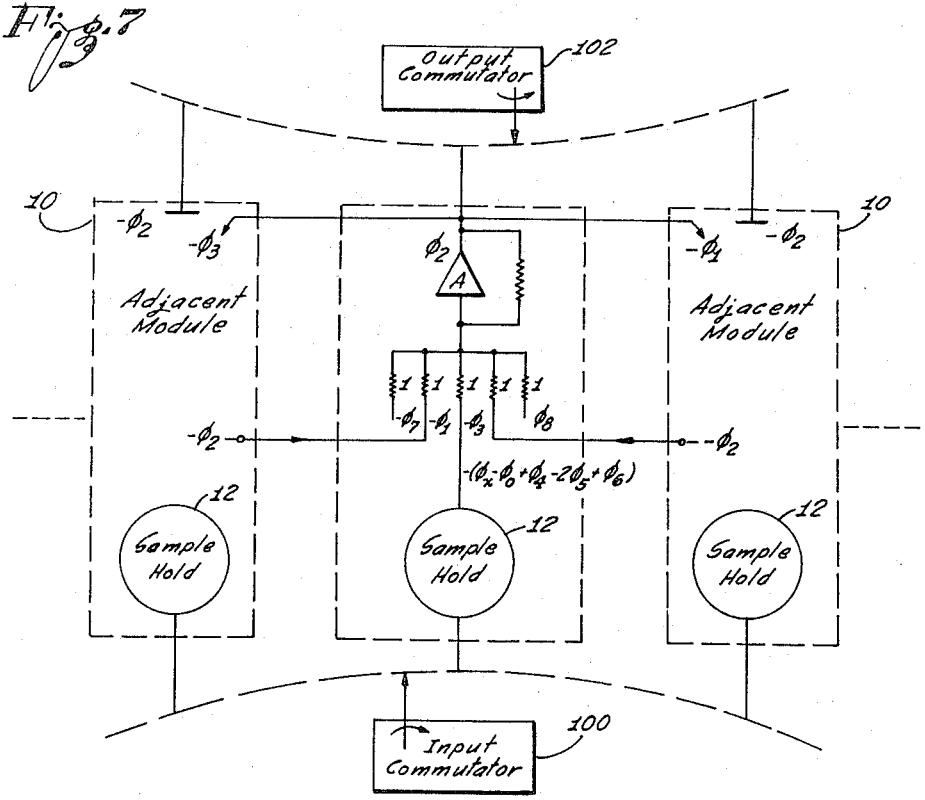

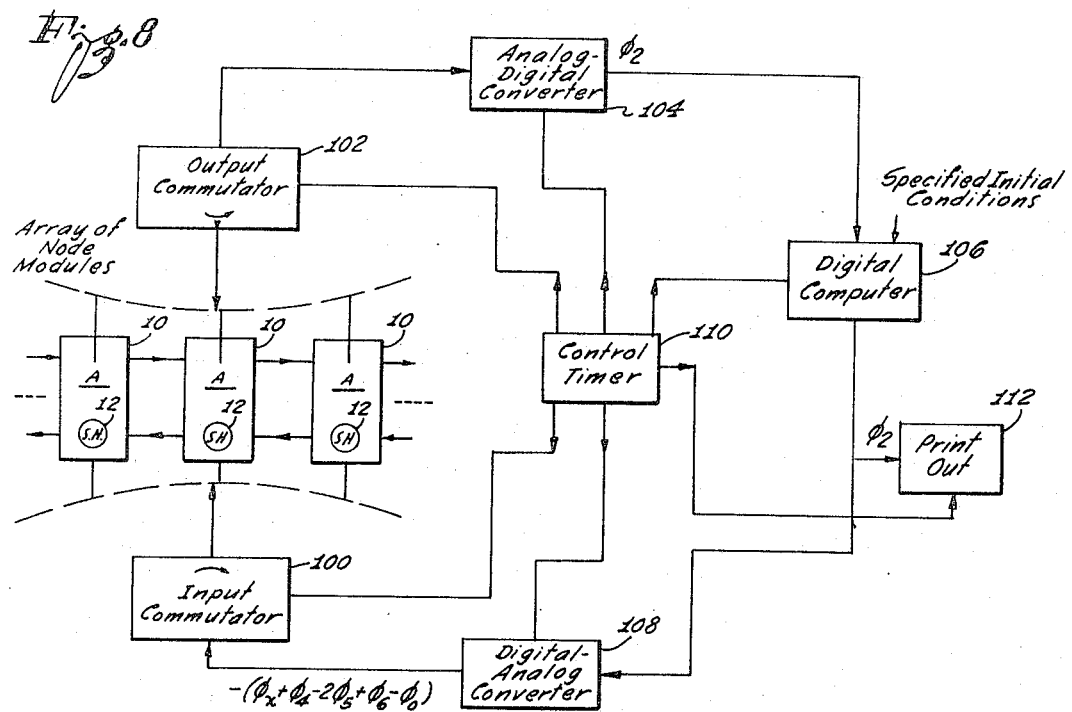
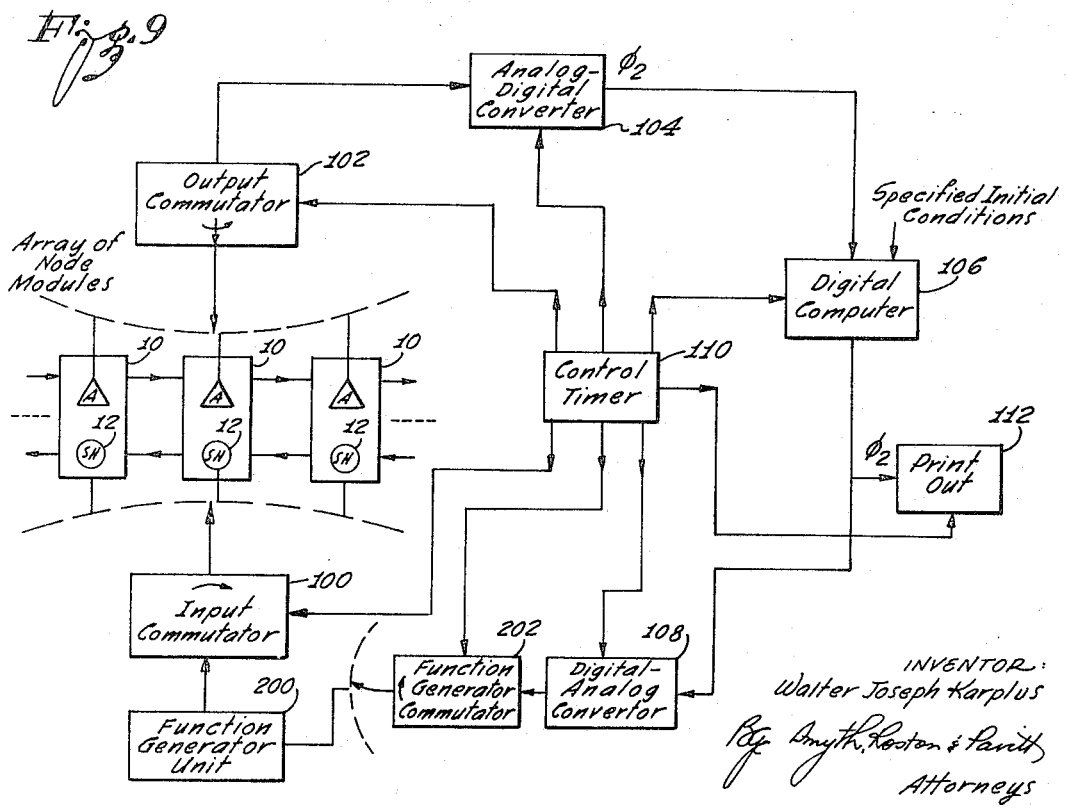

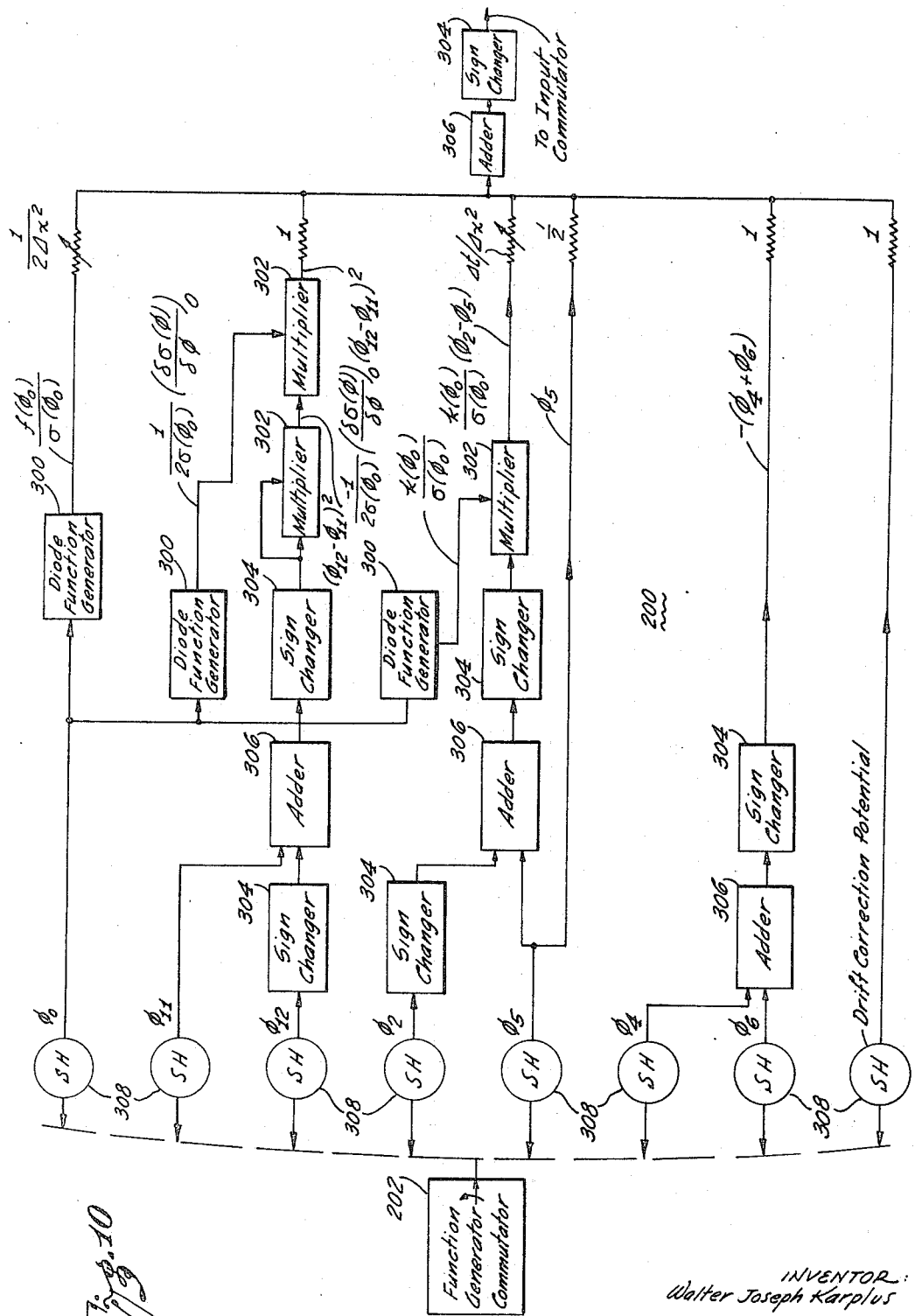

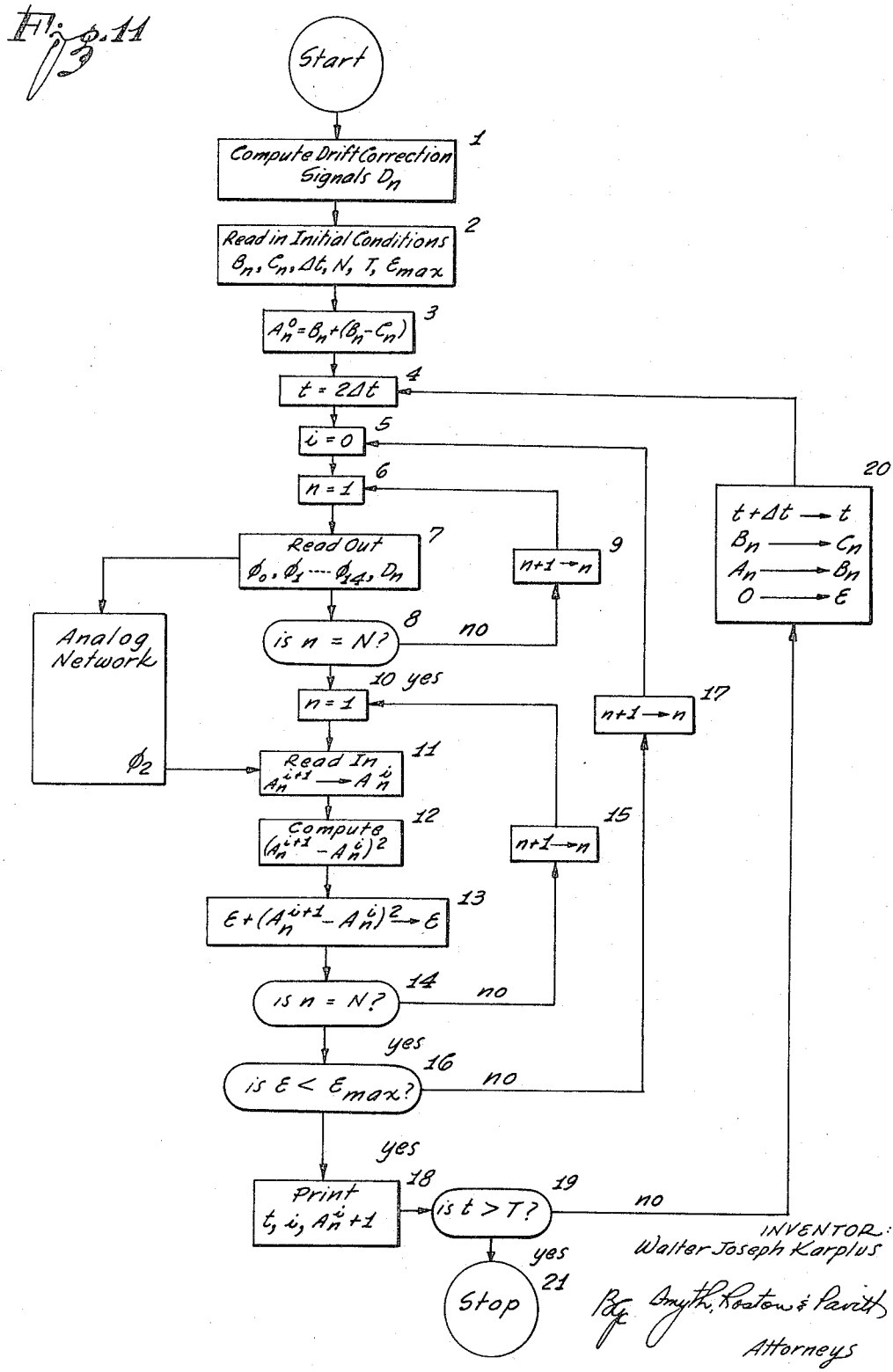

3,317,718
COMPUTER
Walter Joseph Karplus, 7450 Palo Vista Drive,
Los Angeles, Calif. 90046
Filed Mar. 22, 1963, Ser. No. 267,255
11 Claims. (Cl. 235—150.31)

This invention relates to a discrete-space-discrete-time computer. More specifically, the invention relates to a computer in the form of a fully automatic network-type simulator for solving transient field problems.

In a copending patent application Ser. No. 839,160, filed Sept. 10, 1959, now Patent No. 3,093,731, by the same applicant as the instant application, a general purpose field simulator is described. The simulator of the copending application is useful for the solution of most transient field problems and involves essentially the application of one or two initial conditions to a plurality of modules representing points in space. The initial conditions are applied by means of a plurality of potentiometers. An additional potentiometer serves to read or measure the solution which consists of the potential existing at each module representing a point in space at the time epoch under consideration. After each reading a selector switch is rotated and the function of the potentiometers is interchanged. To employ the method described in the copending patent application, it is necessary to read potentials at each step in space by balancing one of the potentiometers and to advance the selector switch.

In the present application the transient field simulator is fully automated to facilitate the solution of nonlinear field problems. Field properties such as conductivity or heat capacity which are functions of the field potential are examples of nonlinear field problems. The system of the present application consists of a plurality of network node modules interconnected to represent the field spatially. The node modules of the present application have a simpler and improved construction in comparison to the node modules disclosed in the copending patent application.

An output commutator is employed to sample in turn the potentials existing during the initial time epoch of each of the known node modules. The output of the commutator is applied to an analog-digital converter so that the measured analog voltages are converted into binary form. The output of the analog-digital converter is applied to a print-out device which serves to record the solution. The output of the analog-digital converter is also directly applied to a digital computer. The primary purpose of the digital computer is to store the potentials existing during the initial time epoch of each of the node modules and to make these potentials available at subsequent time epochs. The potentials stored at each time epoch become at the succeeding time epoch the initial conditions applied to the node modules.

After all the potentials have been determined for a given step of the computation and have been printed out and memorized in the digital computer the system is ready to proceed to the next step in the calculation. Memorized potentials within the digital computer are then read out into a digital-analog converter which converts a memorizid number back to analog form. An input commutator similar to that used in the output of the network module unit distributes the memorized potentials to the appropriate node modules. In order that these potentials be available for the entire calculating interval (of the order of several seconds) an analog memory or sample-hold circuit is supplied with each node module. Dependent upon the type of equation which is to be solved, algebraic combinations of one or more initial conditions must be memorized in the sample-hold circuit of each node module. For example, in the solution of the diffusion equation only one condition is necessary. However, in the solution of the wave and bi-harmonic equation, two initial conditions are required. Also, in order to handle non-linear problems additional information must be memorized. One sample-hold circuit per module supplies for these tasks. The quantities held in the analog memories are therefore combinations of those read out of the digital computer after each computing epoch.

The system therefore consists essentially of a closed loop including the node module, the output commutator, the analog-digital converter, the digital computer, the digital-analog converter, the input commutator, and the sample-hold circuits. A control timer is employed to synchronize the operation of these diverse units and to assure that each unit operates at the appropriate time during the computing cycle. The system is therefore able to automatically operate and print-out solutions over several hundred time epochs.

In addition to the time saving and convenience effected by this automation, the system described has a number of advantages. First, the digital computer can be employed to obtain and apply correction factors to counteract drift and other shortcomings of the components in the analog network. For example, the system can be run initially with zero boundary conditions and zero initial conditions and the resulting output measured. This output is due to zero-offset in the amplifiers comprising the network. These values can then be employed to calculate "auxiliary initial conditions" which when applied to the sample-hold circuits produces the correct zero output. These correction terms can then be used throughout the calculation to offset equipment inaccuracies.

A second important advantage of the digital technique is that it facilitates the solving of nonlinear problems.

The nonlinear problems to be solved are governed by equations of the type $$\frac{\partial}{\partial_x}\left(\sigma(\phi)\frac{\partial \phi}{\partial_x}\right) = k(\phi)\frac{\partial \phi}{\partial t} + f(\phi) \tag{1}$$

$$\frac{\partial}{\partial_x}\left(\sigma(\phi)\frac{\partial \phi}{\partial_x}\right) = k(\phi)\frac{\partial^2 \phi}{\partial t^2} + f(\phi) \tag{2}$$

$$\frac{\partial^2}{\partial_{x^2}}\left(\sigma(\phi)\frac{\partial^2 \phi}{\partial_{x^2}}\right) = k(\phi)\frac{\partial^2 \phi}{\partial t^2} + f(\phi) \tag{3}$$

as well as similar equations in two and three space dimensions and modified forms of these equations involving terms such as $$k(\phi)\frac{\partial \phi}{\partial x}, \frac{\partial f(\phi)}{\partial x} \text{ and } \frac{\partial^2 f(\phi)}{\partial t^2}$$

These equations describe the most important of the transient field problems arising in engineering and applied physics. The technique used by the invention is also applicable to elliptic nonlinear partial differential equations of the type $$\frac{\partial}{\partial x}\left(\sigma(\phi)\frac{\partial \phi}{\partial x}\right) = f(\phi) \tag{4}$$

The presence of the nonlinear terms $\sigma$, $k$, and $f$ in Equations 1, 2, 3 and 4 makes these equations very difficult to solve by means of existing analog and digital techniques. In the case of presently available analog methods it is necessary to provide a multitude of nonlinear elements each possessing a specified nonlinearity. In digital computing methods it becomes necessary either to take very small steps in the time domain in order to avoid computational instability, or it becomes necessary to solve by slowly converging iterative techniques a large system of simultaneous nonlinear algebraic equations at each step in time; both of these possibilities generally imply uneconomically long computer runs and tax the ability of even the largest available digital computers.

The field simulator described in the present application overcomes the aforementioned problems since it has the following characteristics:

(1) Ability to handle from 100 to 1,000 grid points distributed in a one, two or possibly three dimensional region.

(2) Ability to handle analytic nonlinearities as well as nonlinearities available only in graphical form, using a very small amount of nonlinear analog equipment.

(3) Utilization of a relatively small, inexpensive digital computer (for example, an IBM 797, a Scientific Data System 920, or a Packard-Bell 250) to perform calculations which would otherwise be difficult even for a large computer such as the IBM 7090.

(4) Completely automatic operation involving no intervention by the operator in the course of a problem run.

(5) Ability to control truncation errors in the time domain by automatic adjustments of the time step $\Delta t$ in the course of the solution.

A clearer understanding of the invention will become apparent upon reference to the drawings wherein:

FIGURE 1b is a circuit diagram which can be associated with each finite difference grid point illustrated in FIGURE 1a;

FIGURE 6a is a circuit diagram of a single operational amplifier realization of a node module used in solving the parabolic and elliptic field equation;

FIGURE 6b is a circuit diagram of a single operational amplifier realization of a node module used in solving the parabolic and hyperbolic field equations;

FIGURE 6c is a circuit diagram of a single operation amplifier realization of a node module used in solving the biharmonic field equation;

FIGURE 7 is a circuit diagram of a typical node module including a sample-hold used in the solution of the parabolic, hyperbolic and elliptic equations;

FIGURE 8 is a block diagram of a first alternative form of the computer system;

FIGURE 9 is a block diagram of a second alternative form of the computer system;

FIGURE 10 is an example function generator unit which may be used with the computer system of FIGURE 9, and FIGURE 11 is a flow chart explaining the operation of the digital computer included in the computer system.

Figure 1A:
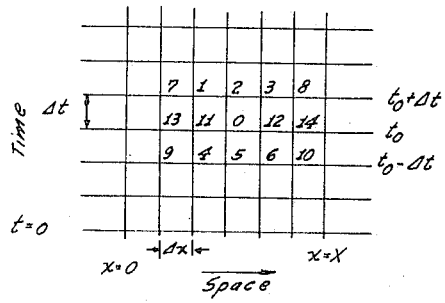
FIGURE 1a is a finite difference grid which is a graphical representation of a field at different times for a one space dimension problem.

The first step in the discrete-space-discrete-time method, as in all digital techniques, involves the approximation of the partial differential equations to be solved by a system of finite difference equations. A one, two, three or four dimensional coordinate grid is imagined superimposed on the field under study, and attention is limited to the net points of the grid. In a problem involving only $x$ and $t$ as independent variables, the finite difference grid has the general form shown in FIGURE 1a, where the $x$ coordinate is generally bounded at $x=0$ and $x=X$ while the time coordinate proceeds from zero to infinity. A typical point within this net is then labeled 0 and the adjacent points in the $x$ and $t$ directions are labeled 1 through 14 as shown.

The partial derivatives in the equation under study are then expressed as differences of the potential between point 0 and points 1 through 14. In order to permit the variation of $\Delta t$ without the possibility of computational instability, it is desirable that the finite difference approximations to be utilized be implicit—that is, express unknown potential implicitly in terms of known potentials. In general, at any step in the computation the potentials in the line $t_0$ and the line $t_0-\Delta t$ are known information, while the potentials in the line $t_0+\Delta t$ have to be determined.

The finite difference equation applicable to each net point is then rearranged and transformed to take the form $$a_1(\phi_1-\phi_0)+a_2(\phi_2-\phi_0) \ldots +a_n(\phi_n-\phi_0)+(\phi_x-\phi_0)=0 \quad (5)$$

where the coefficient $a_1, a_2 \ldots a_n$ are positive or negative constants. All nonlinear terms in the equation are combined in the term $\phi_x$, so that $\phi_x$ is a highly nonlinear function of the potentials $\phi_0, \phi_1 \ldots \phi_{14}$. The technique for arranging the nonlinear partial differential equations in this form is discussed at a later point in the specification.

The next step in the discrete-space-discrete-time method involves the solution of Equation 5 at each point in the space domain. For the first time increment, a number of the potentials in Equation 5 are the specified initial and boundary conditions. The potentials in line $t_0+\Delta t$ constitute the solution for the first time increment. These solution values are then used as initial conditions in the next solution cycle in which the potentials in line $t_0+2\Delta t$ are found. In the succeeding computer cycle the potentials in line $t_0+3\Delta t$ are obtained, etc. The solution is therefore carried out in a stepwise manner in the time domain.

Figure 1B:
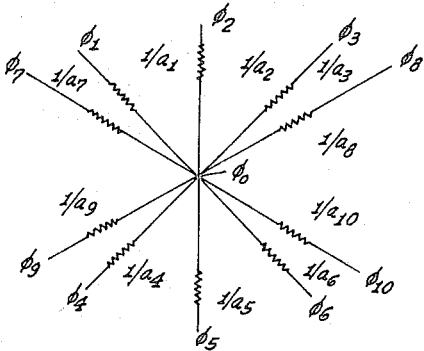

The construction of the computer system is facilitated by recognizing the formal similarity of Equation 5 and Kirchhoff's node law ($\Sigma i_n=0$) governing a junction of electrical resistors (of conductances $a_1, a_2 \ldots a_n$) linking anode with voltage $\phi_0$ with other circuit nodes having voltages $\phi_1, \phi_2 \ldots \phi_n$, and $\phi_x$. A group of electrical resistors, some positive and some negative, can therefore be associated with each finite difference grid point along each space coordinate, as shown in FIGURE 1b. In FIGURE 1b the resistors are designated $1/a_1$ through $1/a_{10}$ and the voltages are designated $\phi_0$ through $\phi_{10}$.

Figure 2:
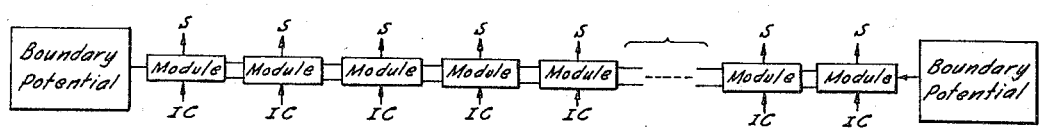
FIGURE 2 illustrates the interrelation of the node modules for a one space dimension field problem.

An electronic analog computer circuit satisfying Equation 5 is constructed for each finite difference net point in the space domain. These circuits are termed node modules and are interconnected as shown in FIGURE 2. Each node module is identified with a specific point in the space domain and has one input and one output. The inputs IC correspond to the sum of the "initial conditions" for each step in the time domain, while the outputs S constitute the potentials at time $t_0+\Delta t$—hence the problem solution for that step in the time domain. The practical realization of these node modules is considered in detail at a later point in the specification.

The technique for reducing the major types of nonlinear partial differential equations of interest to engineers to the form of Equation 5 will now be demonstrated. The equations considered are classified as parabolic, hyperbolic, biharmonic and elliptic partial differential equations, and each classification is considered in turn. In order to simplify the discussion, it is assumed that each partial differential equation contains only two independent variables $x$ and $t$; but the technique is equally applicable to problems in two and three space coordinates. It is also assumed that the $x$ and $t$ domains are divided into discrete increments $\Delta x$ and $\Delta t$ in length (the problem of varying of the spacing $\Delta x$ and $\Delta t$ is to be considered subsequently). The finite difference grid illustrated in FIGURE 1a therefore is descriptive of all of the problems to be considered. In this grid a typical point 0 is selected and adjacent points are designated 1 through 14 as shown. For any step in the calculation it can be assumed that the potentials in line $t_0$ (that is, at points 9, 4, 5, 6 and 10) are known, having been specified initially or determined in the preceding steps of the calculation. The potentials in line $t_0 + \Delta t$ (that is, at points 7, 1, 2, 3, and 8) are unknowns and must be determined simultaneously. Of course not all of these points are required for all types of partial differential equations.

In order to permit the representation of all nonlinear terms by the potential $\phi_x$ in Equation 5, equations of the general form of Equations 1, 2, and 4 are rearranged and transformed to read $$\frac{\partial^2 \phi}{\partial x^2} + F\left(\phi, \frac{\partial \phi}{\partial x}, \frac{\partial \phi}{\partial t}, \frac{\partial^2 \phi}{\partial t^2} \cdots \right) = 0 \quad (6)$$

where the term F depends upon the specific nature of the equation. Similarly equations, such as Equation 3, containing the biharmonic operator, are rewritten as $$\frac{\partial^4 \phi}{\partial x^4} + F\left(\phi, \frac{\partial \phi}{\partial x}, \frac{\partial \phi}{\partial t}, \frac{\partial^2 \phi}{\partial t^2} \cdots \right) = 0 \quad (7)$$

*Parabolic partial differential equations*

The rather general nonlinear parabolic differential equation, Equation 1, is an example of a very important class of partial differential equations. Assume that the nonlinear terms $\sigma$, $k$, and $f$ are provided as graphical plots of these functions versus $\phi$. Expanding the term on the left side of Equation 1 and rearranging yields $$\sigma(\phi)\frac{\partial^2 \phi}{\partial x^2} + \frac{\partial \sigma(\phi)}{\partial x}\frac{\partial \phi}{\partial x} - k(\phi)\frac{\partial \phi}{\partial t} - f(\phi) = 0 \quad (8)$$

Recognizing that $$\frac{\partial \sigma(\phi)}{\partial x} = \frac{\partial \sigma(\phi)}{\partial \phi}\frac{\partial \phi}{\partial x}$$

Equation 8 may be written as $$\frac{\partial^2 \phi}{\partial x^2} + \frac{1}{\sigma(\phi)}\frac{\partial \sigma(\phi)}{\partial \phi}\left(\frac{\partial \phi}{\partial x}\right)^2 - \frac{k(\phi)}{\sigma(\phi)}\frac{\partial \phi}{\partial x} - \frac{f(\phi)}{\sigma(\phi)} = 0 \quad (9)$$

Each of the partial derivatives with respect to $x$ and $t$ in Equation 9 are now approximated by finite difference expressions. The first term on the left side is approximated by the familiar second central difference expression applicable to the points 1, 2, and 3 indicated in FIGURE 1, as $$\frac{\partial^2 \phi}{\partial x^2} = \frac{\phi_1 + \phi_3 - 2\phi_2}{\Delta x^2} \quad (10)$$

Rewriting this expression in terms of differences with respect to point 0 yields $$\frac{\partial^2 \phi}{\partial x^2} = \frac{\phi_1 - \phi_0}{\Delta x^2} - 2\frac{\phi_2 - \phi_0}{\Delta x^2} + \frac{\phi_3 - \phi_0}{\Delta x^2} \quad (11a)$$

The first derivative of $\phi$ with respect to $x$ is written as $$\frac{\partial \phi}{\partial x} = \frac{\phi_{12} - \phi_{11}}{2\Delta x} \quad (11b)$$

For the time derivative a backward difference expression may be employed, $$\frac{\partial \phi}{\partial t} = \frac{\phi_2 - \phi_0}{\Delta t} \quad (11c)$$

Substituting Equations 11a, 11b, and 11c in Equation 9 yields $$\frac{(\phi_1 - \phi_0)}{\Delta x^2} - 2\frac{(\phi_2 - \phi_0)}{\Delta x^2} + \frac{(\phi_3 - \phi_0)}{\Delta x^2}$$
$$+ \frac{1}{\sigma(\phi_0)}\left(\frac{\partial \sigma(\phi)}{\partial \phi}\right)_0 \left(\frac{\phi_{12} - \phi_{11}}{2\Delta x}\right)^2$$
$$- \frac{k(\phi_0)}{\sigma(\phi_0)}\left(\frac{\phi_2 - \phi_0}{\Delta t}\right) - \frac{f(\phi_0)}{\sigma(\phi_0)} = 0 \quad (12)$$

Multiplying through by $\Delta x^2$ and combining the last three terms on the left hand side, yields $$(\phi_1 - \phi_0) - 2(\phi_2 - \phi_0) + (\phi_3 - \phi_0) + (\phi_x - \phi_0) = 0 \quad (13)$$

where $$\phi_x = \phi_0 + \frac{1}{4\sigma(\phi_0)}\left(\frac{\partial \sigma(\phi)}{\partial \phi}\right)_0 (\phi_{12} - \phi_{11})^2$$
$$- \frac{\Delta x^2 k(\phi_0)}{\Delta t \sigma(\phi_0)}(\phi_2 - \phi_0) - \frac{\Delta x^2 f(\phi_0)}{\sigma(\phi_0)} \quad (14)$$

Figure 3:
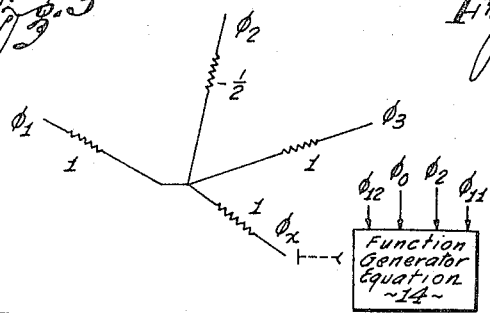
FIGURE 3 is a circuit diagram representing a first embodiment of a node module useful in solving certain types of field problems.

To obtain a physical insight into the significance of these expressions, Equation 13 may now be identified as a Kirchhoff's node law equation characterizing the junction of four resistors—1/2, 1, 1, and 1 in magnitude as shown in FIGURE 3. A voltage $\phi_x$ is generated by means of an analog function generator using voltages $\phi_{12}$, $\phi_0$, $\phi_2$, and $\phi_{11}$ as inputs. $\phi_0$, $\phi_{11}$, and $\phi_{12}$ are known values, while $\phi_1$, $\phi_2$, and $\phi_3$ are unknown. Voltage sources acting at points 1, 2, and 3 must therefore be adjusted simultaneously to produce the specified voltage at $\phi_0$. It should be recognized that the typical node circuits of the type shown in FIGURE 3 for adjacent nodes in the $x$ domain overlap. Thus point 1 of the node in FIGURE 3 is identical with the point 2 of the node immediately to the left. Similarly point 3 of the node shown in FIGURE 3 is identical with point 2 of the node module immediately to the right of the one shown.

The function generator required to generate $\phi_x$ would contain three arbitrary function generators, for example biased diode function generators, to generate the terms $$\frac{1}{\sigma(\phi_0)}\left(\frac{\partial \sigma(\phi)}{\partial \phi}\right)_0, \frac{k(\phi_0)\Delta x^2}{\sigma(\phi_0)\Delta t}, \text{ and } \frac{\Delta x^2 f(\phi_0)}{\sigma(\phi_0)}$$

Each of these diode function generators has one input, $\phi_0$, and one output. This output must then be multiplied by terms such as $(\phi_{12} - \phi_{11})^2$ and $(\phi_2 - \phi_0)$ and combined in accordance with Equation 14. The function generator unit therefore contains three diode function generators, three multipliers and two or three analog adding circuits. Only one such funcion generating unit is required for the whole computer system. A commutator is employed to permit this single function generating unit to calculate $\phi_x$ for each of the node modules in turn. Note that $\phi_x$ is a function of $\phi_2$ which is an unknown voltage. This indicates that calculations at each step in time must be iterative. That is, an initial value for $\phi_x$ is assumed arbitrarily and Equation 13 is solved, providing a value for $\phi_2$ and hence a new value for $\phi_x$. This process is repeated until the solution, $\phi_2$, fails to change appreciably in two successive iterations.

In order to reduce the truncation error at each step in time, a slightly more complex finite difference approximation may be employed. Thus in place of Equation 11a, the second space derivative may be approximated as the average of the second derivatives at points 2 and 5, that is as $$\frac{\partial^2 \phi}{\partial x^2} = \frac{1}{2}\left[\frac{\phi_1 - \phi_0}{\Delta x^2} - 2\frac{\phi_2 - \phi_0}{\Delta x^2} + \frac{\phi_3 - \phi_0}{\Delta x^2} + \frac{\phi_4 - \phi_0}{\Delta x^2} \right.$$
$$\left. - 2\frac{\phi_5 - \phi_0}{\Delta x^2} + \frac{\phi_6 - \phi_0}{\Delta x^2}\right] \quad (15)$$

The equation for the time derivative then becomes $$\frac{\partial \phi}{\partial t} = \frac{\phi_2 - \phi_5}{2\Delta t} \quad (16)$$

Inserting these approximations in the partial differential equation, Equation 9, yields $$(\phi_1 - \phi_0) - 2(\phi_2 - \phi_0) + (\phi_3 - \phi_0) + (\phi_4 - \phi_0)$$
$$+ (\phi_6 - \phi_0) + (\phi_x - \phi_0) = 0 \quad (17)$$

where $$\phi x = \phi_0 + \frac{1}{2\sigma(\phi_0)}\left(\frac{\partial \sigma(\phi)}{\partial \phi}\right)_0 (\phi_{12} - \phi_{11})^2$$
$$- \frac{\Delta x^2}{\Delta t}\frac{k(\phi_0)}{\sigma(\phi_0)}(\phi_2 - \phi_5) - \frac{2\Delta x^2 f(\phi_0)}{\sigma(\phi_0)} \quad (18)$$

Figure 4:
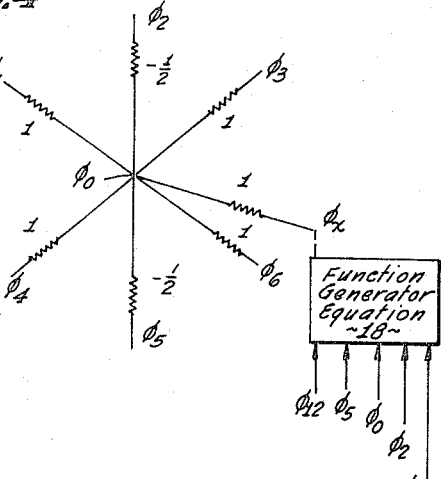
FIGURE 4 is a circuit diagram representing a second embodiment of a node module useful in solving field problems.

Equation 17 may now be identified with a node circuit involving 5 positive resistors and 2 negative resistors as shown in FIGURE 4. Here potentials $\phi_0$, $\phi_4$, $\phi_5$, and $\phi_6$ are known, $\phi_x$ is generated using the function generator and $\phi_1$, $\phi_2$, and $\phi_3$ must be determined simultaneously.

In general, in solving parabolic partial differential equations only one initial condition is specified. Equation 17 and the circuit of FIGURE 4 are therefore "non-self-starting." That is, they are applicable only after at least one step in the calcuation has been completed, so that solutions are known for two time increments. In order to apply Equation 17 and the circuit FIGURE 4 it is therefore necessary to complete one computer run using a self-starting formula such as that of Equation 13 and FIGURE 3.

To form the computer system, node circuits such as those of FIGURE 3 or FIGURE 4 must be connected in cascade so that an equation of the type of Equation 13 is solved simultaneously for each point in space. None of the terms in Equations 13 and 18, and hence none of the elements in FIGURES 3 and 4, with the exception of $\phi_x$, is nonlinear or contains the terms $\Delta x$ or $\Delta t$. Most node modules can therefore be constructed using fixed resistors, and all nonlinearities and changes in time and space increments can be handled by means of the one function generating unit.

*Hyperbolic partial differential equations*

An example of a nonlinear equation describing wave phenomena is Equation 2, where the nonlinearities $\sigma$, $k$ and $f$ are specified as graphical functions of $\phi$. Proceeding as in the case of the parabolic equations, Equation 2 is expanded and rearranged as $$\frac{\partial^2\phi}{\partial x^2}+\frac{1}{\sigma(\phi)}\frac{\partial\sigma(\phi)}{\partial(\phi)}\left(\frac{\partial\phi}{\partial x}\right)^2-\frac{k(\phi)}{\sigma(\phi)}\frac{\partial^2\phi}{\partial t^2}-\frac{f(\phi)}{\sigma(\phi)}=0 \quad (19)$$

The first two terms on the left of Equation 19 are approximated using Equations 15 and 11b respectively, while the second time derivative is approximated by the second central difference with respect to node 0 as $$\frac{\partial^2\phi}{\partial t^2}=\frac{\phi_2+\phi_5-2\phi_0}{\Delta t^2} \quad (20)$$

The finite difference approximation of Equation 19 can then be written as $$(\phi_1-\phi_0)-2(\phi_2-\phi_0)+(\phi_3-\phi_0)+(\phi_4-\phi_0) \\ -2(\phi_5-\phi_0)+(\phi_6-\phi_0)+(\phi_x-\phi_0)=0 \quad (21)$$

where $$\phi_x=\phi_0+\frac{1}{2\sigma(\phi_0)}\left(\frac{\partial\sigma(\phi)}{\partial\phi}\right)_0(\phi_{12}-\phi_{11})^2- \\ \left(\frac{2\Delta x^2}{\Delta t^2}\right)\left(\frac{k(\phi_0)}{\sigma(\phi_0)}\right)(\phi_2+\phi_5-2\phi_0)-\frac{2\Delta x^2 f(\phi_0)}{\sigma(\phi_0)} \quad (22)$$

an expression almost identical to Equation 17.

In the electrical analog, therefore, the typical node module will have the form shown in FIGURE 4 but the function generating unit generates $\phi_x$ in accordance with Equation 22 instead of Equation 19. In formulating hyperbolic differential equations, two initial conditions are specified for each point in space, so that in starting a computer run, the potentials for the first two time increments are known. Equation 21 and FIGURE 4 applied to hyperbolic partial differential equations are therefore self-starting, so that no modification of the procedure is necessary for the first time increment.

*Biharmonic partial differential equations*

An example of a nonlinear equation governing the vibration of beams is Equation 3. Expanding the term on the left-hand side of this equation yields $$\sigma(\phi)\frac{\partial^4\phi}{\partial x^4}+2\left(\frac{\partial\sigma(\phi)}{\partial x}\right)\left(\frac{\partial^3\phi}{\partial x^3}\right)+\left(\frac{\partial^2\sigma(\phi)}{\partial x^2}\right)\frac{\partial^2\phi}{\partial x^2}= \\ k(\phi)\frac{\partial^2\phi}{\partial t^2}+f(\phi) \quad (23)$$

which becomes upon rearranging $$\frac{\partial^4\phi}{\partial x^4}+\frac{2}{\sigma(\phi)}\left(\frac{\partial\sigma(\phi)}{\partial x}\right)\left(\frac{\partial^3\phi}{\partial x^3}\right)+ \\ \frac{1}{\sigma(\phi)}\left(\frac{\partial^2\sigma(\phi)}{\partial x^2}\right)\left(\frac{\partial^2\phi}{\partial x^2}\right)-\frac{k(\phi)}{\sigma(\phi)}\frac{\partial^2\phi}{\partial t^2}-\frac{f(\phi)}{\sigma(\phi)}=0 \quad (24)$$

Equation 24 can be written as $$\frac{\partial^4\phi}{\partial x^4}+\frac{2}{\sigma(\phi)}\left(\frac{\partial\sigma(\phi)}{\partial\phi}\right)\left(\frac{\partial\phi}{\partial x}\right)\left(\frac{\partial^3\phi}{\partial x^3}\right)+ \\ \frac{1}{\sigma(\phi)}\left(\frac{\partial^2\sigma(\phi)}{\partial\phi^2}\right)\left(\frac{\partial^2\phi}{\partial x^2}\right)^2-\frac{k\phi}{\sigma(\phi)}\frac{\partial^2\phi}{\partial t^2}-\frac{f(\phi)}{\sigma(\phi)}=0 \quad (25)$$

Each space and time derivative in Equation 25 is now approximated by a finite difference expression. These approximations take the form $$\left(\frac{\partial^4\phi}{\partial x^4}\right)_0=-\frac{2}{\Delta x^4}(\phi_1-\phi_0)+\frac{3}{\Delta x^4}(\phi_2-\phi_0)-\frac{2}{\Delta x^4}(\phi_3-\phi_0) \\ -\frac{2}{\Delta x^4}(\phi_4-\phi_0)+\frac{3}{\Delta x^4}(\phi_5-\phi_0)-\frac{2}{\Delta x^4}(\phi_6-\phi_0) \\ +\frac{1}{2\Delta x_4}(\phi_7-\phi_0)+\frac{1}{2\Delta x^4}(\phi_8-\phi_0)+\frac{1}{2\Delta x_4}(\phi_9-\phi_0) \\ +\frac{1}{2\Delta x_4}(\phi_{10}-\phi_0)$$

$$\left(\frac{\partial^3\phi}{\partial x^3}\right)_0=\frac{1}{2\Delta x^3}(-2\phi_{11}+2\phi_{12}+\phi_{13}-\phi_{14})$$

$$\left(\frac{\partial^2\phi}{\partial x^2}\right)_0=\frac{1}{\Delta x^2}(\phi_{11}+\phi_{12}-2\phi_0)$$

$$\left(\frac{\partial^2\phi}{\partial t^2}\right)_0=\frac{1}{\Delta t}(\phi_2+\phi_5-2\phi_0) \quad (26)$$

Inserting these expressions into Equation 25 yields $$-2(\phi_1-\phi_0)+3(\phi_2-\phi_0)-2(\phi_3-\phi_0)-2(\phi_4-\phi_0) \\ +3(\phi_5-\phi_0)-2(\phi_6-\phi_0)+\tfrac{1}{2}(\phi_7-\phi_0)+\tfrac{1}{2}(\phi_8-\phi_0) \\ +\tfrac{1}{2}(\phi_9-\phi_0)+\tfrac{1}{2}(\phi_{10}-\phi_0)+(\phi_x-\phi_0)=0 \quad (27)$$

where $$\phi_x=\phi_0+\frac{1}{2\sigma(\phi_0)}\left(\frac{\partial\sigma(\phi)}{\partial\phi}\right)_0(-2\phi_{11}+2\phi_{12} \\ +\phi_{13}-\phi_{14})(\phi_{12}-\phi_{11}) \\ +\frac{1}{\sigma(\phi_0)}\left(\frac{\partial^2\sigma(\phi)}{\partial\phi^2}\right)_0(\phi_{11}+\phi_{12}-2\phi_0)^2 \\ -\frac{\Delta x^4 k(\phi)_0}{\Delta t^2 \sigma(\phi_0)}(\phi_5+\phi_2-2\phi_0)-\frac{\Delta x^4 f(\phi_0)}{\partial(\phi_0)}=0 \quad (28)$$

Figure 5:
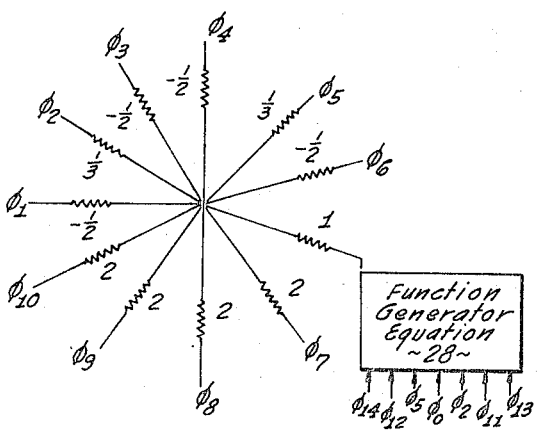
FIGURE 5 is a circuit diagram representing a third embodiment of a node module useful in solving field problems.

As before all nonlinearities and all terms involving time and space increments have been combined in the term $\phi_x$. The node module applying to any mode 0 can then be represented by a junction of 11 resistors as shown in FIGURE 5, which could remain fixed regardless of the type of nonlinearity and the finite difference increments. A function generating unit must be provided to accept as inputs the potentials at points 0, 2, 5, 11, 12, 13, and 14 in order to generate $\phi_x$ in accordance with Equation 28. This unit is relatively complex, but it must be remembered that only one such unit is required regardless of the number of net points used.

*Elliptic partial differential equations*

As an example of a nonlinear elliptic partial differential equation, consider Equation 4 which may be expanded as $$\sigma(\phi)\frac{\partial^2\phi}{\partial x^2}+\frac{\partial\sigma(\phi)}{\partial x}\frac{\partial\phi}{\partial x}-f(\phi)=0 \quad (29)$$

or $$\frac{\partial^2\phi}{\partial x^2}+\frac{1}{\sigma(\phi)}\frac{\partial\sigma(\phi)}{\partial\phi}\left(\frac{\partial\phi}{\partial x}\right)^2-\frac{f(\phi)}{\sigma(\phi)}=9 \quad (30)$$

The first and second space derivatives are approximated as in Equations 11a and 11b so that the finite difference approximation of Equation 30 may be written as $$(\phi_1-\phi_0)-2(\phi_2-\phi_0)+(\phi_3-\phi_0)+(\phi_x-\phi_0)=0 \quad (31)$$

where $$\phi_x=\phi_0+\frac{1}{4\sigma(\phi_0)}\left(\frac{\partial\sigma(\phi_0)}{\partial\phi}\right)_0(\phi_{12}-\phi_{11})^2-\frac{\Delta x^2 f(\phi_0)}{\sigma(\phi_0)} \quad (32)$$

Note the similarity between Equations 31 and 32 and Equations 13 and 14 applying to the diffusion equation. In fact these two equations are identical except that Equation 14 contains an additional term inversely proportional to $\Delta t$. The solution procedure for these two equations is identical. Since time is not a variable in Equation 4, the solution is calculated for only "one time increment"; that is, the solution is complete once the iterations for Equation 31 have converged.

An array of analog node modules is employed to solve the set of difference equations for each step in time. It is this operation which is most time consuming in pure digital solutions of linear and especially nonlinear partial differential equations. On the other hand, an analog network "relaxes" to the correct solution in a negligible amount of time. In such an analog system the magnitudes of the dependent variables (i.e., the potentials $\phi$) appear as D.C. voltages proportional in magnitude to the variables represented. Accordingly, the initial conditions for each step in time are applied to the network in the form of D.C. voltages and the solution values are read out of the network also in the form of voltages. The modules comprising the analog network are designed to be very simple and inexpensive, containing only fixed elements.

A separate node module is required for each point in space. The purpose of these modules is to solve Equation 5 for each step in the time domain. Such modules may be designed by simulating directly a circuit such as that of FIGURE 1b—that is, by constructing a junction of positive and negative resistors, with a voltage source acting on node 2 to force the potential at node 0 to the values specified by the initial conditions. An economy in equipment can be effected by rewriting Equation 5 to read $$-a_2\phi_2=a_1\phi_1+a_2\phi_2+a_3\phi_3\ldots+a_{10}\phi_{10}$$
$$+(a_1+a_2+a_3\ldots+a_{10}+1)\phi_0 \quad (33)$$

where the coefficient $a_1\ldots a_{10}$ may in general be positive or negative numbers. To solve the parabolic Equation 1, the finite difference approximation Equation 13 is rearranged to read $$2\phi_2=\phi_1+\phi_3+(\phi_x-\phi_0) \quad (34)$$

Similarly, the finite difference expressions Equations 17 or 21 are rearranged to read $$2\phi_2=\phi_1+\phi_3+\phi_4-2\phi_5+\phi_6+(\phi_x-\phi_0) \quad (35)$$

The module for the nonlinear biharmonic equation, Equation 3, is obtained by writing Equation 27 as $$3\phi_2=2\phi_1+2\phi_3+2\phi_4-3\phi_5+2\phi_6-\tfrac{1}{2}\phi_7$$
$$-\tfrac{1}{2}\phi_8-\tfrac{1}{2}\phi_9-\tfrac{1}{2}\phi_{10}-(\phi_x-\phi_0) \quad (36)$$

The simplest possible realization for each node module is obtained by multiplying by $-1$ both sides of those of Equations 34, 35 and 36 applying to alternate points in the $x$ domain. For example, if there are 100 net points, labeled 1 through 100, along the $x$ coordinate, the equations applying to all points with even numbers are multiplied by $-1$ while those applying to odd-numbered points are left unchanged. In that event, the output potentials of the even-numbered node modules will actually be the negative of the solution for that point in time and space. This sign change must of course be taken into account in printing out the solution. The advantage of this reformulation is that it permits the solution of the system of difference equations using but one operational amplifier at each node. This follows from the fact that now the output potential $\phi_2$ of any node module is identical to the potentials $-\phi_1$ and $-\phi_3$ of adjacent modules.

Node modules for the solution of Equations 34, 35 and 36 can therefore take the form shown in FIGURES 6a, 6b and 6c respectively. The symbol

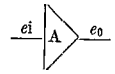

designates a D.C. operational amplifier having one input $e_0$ and one input $e_i$, and $e_0=-Ae_i$ where A is a positive number greater than 1000. The relative values of the resistors are as indicated and the resistors have voltage inputs as shown.

In the circuits shown in FIGURES 6a, 6b and 6c the input potentials $\phi_1$, $\phi_3$, $\phi_7$, and $\phi_8$ are identical with the potentials $\phi_2$ of adjacent node modules. The output terminal $\phi_2$ of each module is therefore connected to the terminals marked $\phi_1$ and $\phi_3$ of adjacent node modules. Similarly potential $\phi_5$ corresponds to the potentials $\phi_4$ and $\phi_6$ of adjacent node modules. These terminals may therefore be interconnected. The potentials $(\phi_x-\phi_0)$ and $\phi_5$ for each node module must be supplied by voltage sources.

In earlier developments of the Discrete-Space-Discrete-Time technique as described in the copending patent application, resistance potentiometers served as voltage sources. In order to minimize the necessary function generating equipment, and in order to utilize the long-time memory capabilities of the digital computer, it is desirable that all the node modules time-share a single function generator and the digital computer memory. Accordingly, the potentials corresponding to $\phi_0$, $\phi_4$, $\phi_5$, $\phi_6$ and $\phi_x$ are read directly out of the digital computer or are generated by the analog function generating unit. These values appear in sequence (serially) at the output of the digital-analog converter and are distributed to the appropriate node modules by means of an input commutator. Thus the input commutator serves to convert the serial data from the digital computer into parallel form for use by the analog network. It then becomes necessary to supply each node module with a short-time memory to store the voltage supplied through the input commutator until the computation cycle (for that time increment) is complete. One such memory, commonly termed sample-hold, is required for each module. These sample-hold circuits can be of simple conventional design, but must be capable of holding the applied voltage with negligible error for a number of seconds. Such a sample-hold circuit is described on pages 6–27 of the "Computer Handbook" by Huskey and Korn.

A typical node module for the solution of parabolic, hyperbolic and elliptic equations may then take the form shown in FIGURE 7. Each module 10 has one sample-hold circuit 12 which is periodically in contact with the pole of an input commutator 100, and one output terminal which is sampled periodically by the pole of an output commutator 102. The node module is connected to adjacent modules in the positive and negative directions through two connectors each. One of the connections in each direction serves to apply the output potential $\phi_2$ to the adjacent modules; the other connections serve to bring in the potentials $-\phi_1$ and $-\phi_3$, which are actually the potentials $\phi_2$ of the adjacent modules. Modules adjacent to field boundaries are connected to voltage supplies generating potentials proportional to the specified boundary conditions.

The input resistors labeled $\phi_7$ and $\phi_8$ are required to treat the biharmonic equation. These resistors can also serve in the treatment of problems of the type of Equations 1, 2, and 4 in two space dimensions. In the latter case these two resistors are connected to the output terminals of the adjacent nodes in the positive and negative $y$ directions. For problems in three space dimensions, two additional resistors are required.

It appears, therefore, that a node module including one amplifier, one sample-hold circuit and six fixed precision resistors suffices for the solution of parabolic, hyperbolic and elliptic problems in two space dimensions, and for the solution of biharmonic problems in one space dimension. None of these elements is dependent upon $\Delta x$, $\Delta t$, or the specified nonlinearities.

An additional refinement involves the replacement of some of the fixed resistors in a few of the node modules with decades or variable resistors. For example the resistors attached to $\phi_1$ and $\phi_7$ in FIGURE 7 may be replaced by resistance potentiometers. These node modules can then be employed at the interface of two regions of the field in which different sizes of the net spacing $\Delta x$ are employed. The setting of these variable resistors can be determined from the coefficients of Equation 5 applying to the net point under consideration.

The overall computer system can take two alternative forms. The first form of the system is where the nonlinear terms $$\frac{1}{\sigma(\phi_0)}\left(\frac{\partial \sigma(\phi)}{\partial \phi}\right), \frac{k(\phi_0)}{\sigma(\phi_0)}, \frac{f(\phi_0)}{\sigma(\phi_0)}$$

etc. are generated within the digital computer. In order that this be practical, it is necessary that there be available approximations to the nonlinearities, which are sufficiently simple to permit the digital computer to generate the nonlinear function $\phi_x$ for each net point without an uneconomic expenditure of computing time. For more complex nonlinear functions, it may be preferable to use a second form of the system including an analog function generating unit.

The first alternative form of the computer system, as shown in FIGURE 8, is a closed loop of analog and digital components. The loop consists of the following elements. A network of node modules 10 of the type shown in FIGURES 6a, 6b and 6c, one for each point in space. An output commutator 102 which samples the output signal ($\phi_2$) of each node module in turn. The parallel outputs of the analog network are therefore converted into serial form. The output commutator 102 may be a Model DY2911 scanner manufactured by the Dymec Division of the Hewlett-Packard Co. An analog-digital converter 104 which translates the analog voltages at the outputs of each of the node modules into a digital code compatible with that of the digital computer. The analog-digital converter 104 may be a Model DY2401A integrating voltmeter manufactured by the Dymec Division of the Hewlett-Packard Co. A digital computer 106, with a memory capacity at least equal to three times the number of net points. For this purpose a small computer such as the IBM 797, Packard-Bell 250 or the Bendix G15 may be used. A digital-analog converter 108 to translate the output signals of the digital computer into analog form. A digital-analog converter as shown in FIGURE 18.75 and described on page 18.45 of the "Computer Handbook" (Huskey and Korn editors) published by McGraw-Hill, may be used for this purpose. An input commutator 100 to distribute the sequentially arriving analog signals at the output of the digital-analog converter to the appropriate input terminals of the node modules. The input commutator 100 may also be a Model DY2911 scanner manufactured by the Dymec Division of the Hewlett-Packard Co. A control-timer 110 synchronizes the operation of the various units in the loop 112 to insure the proper sequential performance. A printer 112 records the problem solution.

The digital computer unit 106 is programmed to perform four main functions. First, the digital computer 106 serves as a memory for the output potentials $\phi_2$ (the solutions for each computation cycle) and makes these potentials available as initial conditions ($\phi_0$, $\phi_4$, $\phi_5$ and $\phi_6$) in subsequent computation cycles. Second, the digital computer 106 serves to generate the potentials $\phi_x$ in accordance with Equations 14, 18, 22 or 28. Since $\phi_x$ is in general a function of the unknown potential $\phi_2$, a series of iterative computer runs through the hybrid loop must be made for each time increment. Initial values of $\phi_x$ are assumed for each net point and computations are continued until the potentials $\phi_2$ in two successive iterative cycles fails to show any appreciable change. The digital computer 106 thirdly serves to test successive values of $\phi_2$ for such convergence. Once a specified convergence criterion has been satisfied, the digital computer emits a signal which permits progression to the succeeding time increment.

The principal source of error, arising in the utilization of the analog operational units employed in each of the node modules, is amplifier drift or zero-offset. To obviate the necessity for expensive stabilization and drift-elimination circuits, a calibration computer run is made prior to each problem solution. In this calibration run all initial and boundary conditions are set to zero, so that the solution values should be zero. In the presence of drift, the output voltages $\phi_2$ will deviate from zero. Accordingly, suitable correction potentials are applied at the input terminals of each node module. These correcting potentials compensate for the drift such that the desired zero output conditions result. It is a fourth function of the digital computer 106 to store the appropriate correction potential for each node module and to add this value to the calculated input term $\phi_x$ at each step in the calculation.

The second alternative form of the computer system is used when the nonlinear functions to be generated are relatively complex, or when it is desired to change these functions frequently. During these situations it may be preferable to generate the nonlinear potential $\phi_x$ using analog equipment instead of relying upon the digital computer. In that event the hybrid computer loop is modified, as shown in FIGURE 9, by the addition of an analog function generating unit 200 and a function generator commutator 202. The function generator commutator may also be a Model DY2911 scanner manufactured by Dymec Division of Hewett-Packard Co. The function generating unit 200 receives at its input the necessary potentials $\phi_0$ to $\phi_{14}$. These potentials (which correspond to the potentials $\phi_0$ and $\phi_5$ of various node modules) are read out of the memory of the digital computer 106 as required and are converted into analog form by the digital-analog converter 108. The commutator 202 is employed to distribute these potentials to corresponding sample-hold circuits within the analog function generator unit. The output of the function generating unit is applied to the main input commutator, which in turn distributes these potentials to the appropriate node modules. Thus the function-generator commutator goes through a complete cycle each time the input commutator steps from the input terminal of the node module to that of the next node module.

FIGURE 10 is an example of a function generating unit 200 for generating the potentials of Equation 18 which correspond to the nonlinear terms of Equations 1 and 2.

The function generating unit normally would contain one or more biased-diode function generators. In the example shown in FIGURE 10 three biased-diode generators 300 are used. These biased-diode function generators 300 approximate nonlinear functions by a piecewise linear approximation, usually employing 20 or more line segments. The function generator 200 may use biased-diode function generators of the type employed in most commercial analog computers. In addition, the function generating unit 200 contains a number of analog multipliers 302, sign changers 304, adders 306 and sample-hold circuits 308 to permit the generation of $\phi_x$ as specified.

The use of the analog function generating unit 200 has the advantage that the complexity of the nonlinear functions has no effect upon the overall computing time, since the function generating unit 200 acts "instantaneously" regardless of the nature of the specific functions being generated. On the other hand, the transition from the hybrid loop of FIGURE 8 to that of FIGURE 9 involves the transmission from the digital computer 106 to the function generating unit 200 of a number of additional data for each point in space.

The operation of the hybrid computing system as shown in FIGURES 8 and 9 for the solution of equations of the type of Equations 1 through 4 takes the following general steps:

(1) The 1, 2, or 3 dimensional field under study is represented by an array of finite difference grid points, and a node module is provided for each such point. These modules are interconnected as described above, and suitable boundary potentials are applied to those modules adjacent to a field boundary.

(2) A calibration run is performed to eliminate any errors due to drift or zero offset in the electronic amplifiers within the node modules. This run results in the storage within the digital computer of a correction potential to be added to the input potential of each node module.

(3) The specified nonlinear functions $\sigma(\phi)$, $f(\phi)$, $k(\phi)$, etc., are introduced into the system either by storing them in the digital computer memory, or by suitable adjustments of the analog function generators.

(4) The time increment $\Delta t$ is specified either by introducing it into the digital computer or by suitable adjustment in the analog function generating unit.

(5) The specified initial conditions for the problem are fed into the digital computer.

(6) The computing system is now set to operate automatically. For each time increment a series of sub-cycles are performed until convergence of the nonlinear term $\phi_x$ is obtained. The solution for that step of the problem, $\phi_2$ for each net point, is then printed out and the computer automatically steps ahead to the next step in time.

(7) When a specified number of time steps $\Delta t$ have been completed the computer comes to a stop.

FIGURE 11 is a flow chart explaining the operation of the computer system with reference to the specific digital computer program. Assume that a hyperbolic equation, such as Equation 2, is to be solved using N net points in the space domain. Identify a typical net point with the subscript $n$, each step in the time domain by the subscript $t$, and the iterative sub-cycles for each step in time by the superscript $i$. Assume further that four sets of N digital computer memory registers are available. The first set of memory registers, designated $A_n$, serves to store solution values for time $t_0+\Delta t$, ($\phi_2$). The second set, designated $B_n$, serves to store solution values applying to time, $t_0,(\phi_0)$. The third set of memory registers, designated $C_n$, serves to hold solution values for time $t_0-\Delta t,(\phi_5)$. The fourth set of memory registers, designated $D_n$, serves to store the correction potentials which must be applied at the input of each node module to compensate for drift and zero-offset in the operational amplifiers. The digital computer program as shown in FIGURE 11 is as follows:

Box 1: A subroutine is employed to compute the drift correction signals for each node module. These are stored in registers $D_1, D_2 \ldots D_N$.

Box 2: Specified initial data is read into the machine. Two initial conditions $B_n$ and $C_n$ are supplied for each point in the space domain. In addition the time increment $\Delta t$, the number of net points N, the number of steps in the time domain to be taken T, and an error criterion $E_{max}$, are read into the machine. The last term serves as a convergence criterion for the iterative sub-cycles.

Box 3: A preliminary estimate is made of the potentials at time $t_0+\Delta t$, by using the specified initial conditions. These estimates are placed in memory registers, $A^1$, $A_2 \ldots A_N$.

Box 4: The index $t$ is set to $2\Delta t$ to indicate that the solution is to obtain for the second time increment.

Box 5: The index $i$ counting the number of iterative sub-cycles is set to zero.

Box 6: The index $n$ counting the number of net points is set to unity.

Box 7: The potentials required to form the input signal for each of the node modules are read out of the digital computer and into the digital-analog converter. If no analog function generating unit is available, the nonlinear potential $\phi_x$ is also formed in this step of the calculation.

Box 8: The $n$ register is examined to see if all net points have been traversed.

Box 9: If the answer to the question in Box 8 is negative the next net point, $n+1$ it treated.

Box 10: If the answer to the question in Box 8 is affirmative the $n$ register is returned to unity.

Box 11: The output potentials ($\phi_2$) of each of the node modules are read into the corresponding $A_n$ registers of the digital computer in turn.

Box 12: The change in these potentials from the preceding iterative sub-cycle is computed for each point.

Box 13: The square of the change in the solution values for each point in space is added to the E register.

Box 14: The $n$ register is examined to see if all net points have been traversed.

Box 15: If the answer to the question in Box 14 is negative the next net point, $n+1$, is treated.

Box 16: If the answer to the question in Box 14 is affirmative, the content of the E register is examined to see if the convergence criterion is satisfied.

Box 17: If the answer to the question in Box 16 is negative the index $i$ is advanced by unity and the steps in Boxes 6 through 16 are repeated.

Box 18: If the answer to the question in Box 16 is affirmative, the solution for that computation cycle is printed out. The print out information includes the time, $t$, the number of iterative sub-cycles which have been performed, $i$, and the solution values $A_1, A_2 \ldots A_N$.

Box 19: The $t$ register is examined to see if the specified time domain has been traversed.

Box 20: If the answer to the question in Box 19 is negative, the time index $t$ is advanced by the time increment $\Delta t$; the information in the B registers is transferred to the C registers; the information in the A registers is transferred to the B registers; the E register is set to zero. Steps 5 through 19 are then repeated.

Box 21: If the answer to the question posed in Box 19 is affirmative, the calculation is complete and the computer comes to a stop.

One of the advantages of the hybrid technique of the invention over a pure digital computation is that the calculation steps in Boxes 5 through 16 can be accomplished more rapidly by hybrid methods than by pure digital methods.

This invention has been described with reference to particular embodiments but the invention is only to be limited by the following claims:

I claim:

1. A computer for solving transient field problems, including,
   a plurality of node modules having input and output terminals for simulating the characteristics of discrete points in the field, each of the node modules including a plurality of interconnected circuit elements and with the circuit elements of each node module interconnected with the circuit elements of other circuit elements to form an electrical circuit array having electrical characteristics simulating the characteristics at discrete field positions of the field, first means operatively coupled to the input terminals of the plurality of node modules for distributing analog signals to the node modules representative of the initial characteristics of the field at a particular time, second means operatively coupled to the output terminals of the plurality of node modules for sampling the analog signals appearing at the output terminals of the plurality of node modules and for producing output signals in accordance with the sampled signals, third means operatively coupled to the second means and responsive to the output signals for producing digital signals having characteristics in accordance with the characteristics of the output signals, fourth means operatively coupled to the third means and responsive to the digital signals for storing the digital signals, fifth means operatively coupled to the fourth means and to the first means and responsive to the stored digital signals for producing analog signals having characteristics in accordance with the digital signals and for coupling the analog signals to the first means.

2. A computer for solving field equations representing transient field problems, including a plurality of node modules having input and output terminals with individual ones of the plurality of node modules simulating the characteristics of discrete points in the field, first means operatively coupled to the input terminals of the plurality of node modules for distributing signals to the node modules representative of the initial characteristics of the field at a particular time, second means operatively coupled to the output terminals of the plurality of node modules for sampling signals appearing at the output terminals of the plurality of node modules and for producing output signals in accordance with the sampled signals, third digital computer means operatively coupled to the second means and responsive to the output signals produced by the second means for storing the output signals and for modifying the characteristics of the stored signals in accordance with the characteristics of the field equations representing the transient field problems, and fourth means operatively coupled to the first and third means and responsive to the modified signals produced by the third means for coupling the modified signals to the first means.

3. The computer as described in claim 2 wherein digital signals representing initial characteristics of the discrete points in the field are applied to the digital computer.

4. The computer of claim 2 wherein the digital computer additionally modifies the stored signals to correct for errors in the computer system.

5. The computer of claim 2 wherein the first means include a converter for producing analog signals having characteristics in accordance with the characteristics of the modified signal and wherein the second means include a converter for producing digital signals having characteristics in accordance with the characteristics of the signals appearing at the output terminals of the plurality of node modules.

6. A computer for solving field equations representing transient field problems, including a plurality of node modules having input and output terminals for simulating the characteristics of discrete points in the field, each of the node modules including a plurality of interconnected circuit elements and with the circuit elements of each node module interconnected with the circuit elements of other circuit elements to form an electrical circuit array having electrical characteristics simulating the characteristics at discrete field positions of the field, first means operatively coupled to the input terminals of the plurality of node modules for distributing signals to the node modules representative of the initial characteristics of the field at a particular time, second means operatively coupled to the output terminals of the plurality of node modules for sampling signals appearing at the output terminals of the plurality of node modules and for producing output signals in accordance with the sampled signals, third digital computer means operatively coupled to the second means and responsive to the output signals produced by the second means for storing the output signals and for modifying the characteristics of the stored signals in accordance with the characteristics of the field equations representing the transient field problems, and fourth means operatively coupled to the first and third means and responsive to the modified signals produced by the third means for coupling the modified signals to the first means.

7. A computer for solving transient field problems, including, a plurality of node modules having input and output terminals with individual ones of the plurality of node modules simulating the characteristics of discrete points in the field.

first means operatively coupled to the input terminals of the plurality of node modules for distributing signals to the node modules representative of the initial characteristics of the field at a particular time, second means operatively coupled to the output terminals of the plurality of node modules for sampling signals appearing at the output terminals of the plurality of node modules and for producing output signals in accordance with the sampled signals, and third means including a digital computer operatively coupled to the first and second means and responsive to the output signals produced by the second means, for storing the output signals and for coupling the stored signals to the first means and wherein digital signals representing the initial characteristics of the discrete points in the field are applied to the digital computer.

8. A computer for solving transient field problems, including, a plurality of node modules having input and output terminals with individual ones of the plurality of node modules simulating the characteristics of discrete points in the field, first means operatively coupled to the input terminals of the plurality of node modules for distributing signals to the node modules representative of the initial characteristics of the field at a particular time, second means operatively coupled to the output terminals of the plurality of node modules for sampling signals appearing at the output terminals of the plurality of node modules and for producing output signals in accordance with the sampled signals, and third means including a digital computer operatively coupled to the first and second means and responsive to the output signals produced by the second means, for storing the output signals and for coupling the stored signals to the first means and wherein the digital computer modifies the stored signals to correct for errors in the computer system.

9. A computer for solving transient field problems, including, a plurality of node modules having input and output terminals with individual ones of the plurality of node modules simulating the characteristics of discrete points in the field by an analog representation of the field, first means operatively coupled to the input terminals of the plurality of node modules for distributing analog signals to the node modules representative of the initial characteristics of the field at a particular time, second means operatively coupled to the output terminals of the plurality of node modules for sampling the analog signals appearing at the output terminals of the plurality of node modules and for producing output signals in accordance with the sampled signals, third means operatively coupled to the second means and responsive to the output signals for producing digital signals having characteristics in accordance with the characteristics of the output signals, fourth means including a digital computer operatively coupled to the third means and responsive to the digital signals for storing the digital signals and wherein digital signals representing the initial characteristics of the discrete points in the field are applied to the digital computer, and fifth means operatively coupled to the fourth means and to the first means and responsive to the stored digital signals for producing analog signals having characteristics in accordance with the digital signals and for coupling the analog signals to the first means.

10. A computer for solving field equations representing transient field problems, including, a plurality of node modules having the input and output terminals with individual ones of the plurality of node modules simulating the characteristics of discrete points in the field, first means operatively coupled to the input terminals of the plurality of node modules for distributing signals to the node modules representative of the initial conditions of the field at a particular time, second means operatively coupled to the output terminals of a plurality of node modules for sampling signals appearing at the output terminals of the plurality of node modules and for producing output signals in accordance with the sampled signals, third means including a digital computer operatively coupled to the second means and responsive to the output signals produced by the second means for storing the output signals and wherein digital signals representing initial characteristics of the discrete points in the field are applied to the digital computer, fourth means operatively coupled to the third means and to the first means and responsive to the stored signals for modifying the characteristics of the stored signals in accordance with the characteristics of the field equations representing the transient field problems, and fifth means operatively coupled to the first and fourth means and responsive to the modified signals produced by the fourth means for coupling the modified signals to the first means.

11. A computer for solving field equations representing transient field problems, including, a plurality of node modules having the input and output terminals with individual ones of the plurality of node modules simulating the characteristics of discrete points in the field, first means operatively coupled to the input terminals of the plurality of node modules for distributing signals to the node modules representative of the initial conditions of the field at a particular time, second means including a converter operatively coupled to the output terminals of a plurality of node modules for sampling signals appearing at the output terminals of the plurality of node modules and for producing digital signals having characteristics in accordance with the characteristics of signals appearing at the output terminals of the plurality of node modules, third means operatively coupled to the second means and responsive to the output signals produced by the second means for storing the output signals, fourth means operatively coupled to the third means and to the first means and responsive to the stored signals for modifying the characteristics of the stored signals in accordance with the characteristics of the field equations representing the transient field problems, fifth means operatively coupled to the first and fourth means and responsive to the modified signals produced by the fourth means for coupling the modified signals to the first means, and sixth means operatively coupled between the third and fourth means for producing digital signals having characteristics in accordance with the characteristics of stored signals.

References Cited by the Examiner
UNITED STATES PATENTS 2,494,036    1/1950    Darlington    235—182
2,569,646    10/1951    Wade et al.    235—182 X MALCOLM A. MORRISON, *Primary Examiner.*

A. J. SARLI, *Assistant Examiner.*